(12) United States Patent
Bhargava et al.

(10) Patent No.: US 11,854,280 B2
(45) Date of Patent: Dec. 26, 2023

(54) LEARNING MONOCULAR 3D OBJECT DETECTION FROM 2D SEMANTIC KEYPOINT DETECTION

(71) Applicant: TOYOTA RESEARCH INSTITUTE, INC., Los Altos, CA (US)

(72) Inventors: Arjun Bhargava, San Francisco, CA (US); Haofeng Chen, Stanford, CA (US); Adrien David Gaidon, Mountain View, CA (US); Rares A. Ambrus, San Francisco, CA (US); Sudeep Pillai, Santa Clara, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 165 days.

(21) Appl. No.: 17/242,046

(22) Filed: Apr. 27, 2021

(65) Prior Publication Data

US 2022/0343096 A1    Oct. 27, 2022

(51) Int. Cl.
*G06V 20/00* (2022.01)
*G06V 20/64* (2022.01)
*G05D 1/02* (2020.01)
*G06V 20/40* (2022.01)
*G06V 20/56* (2022.01)
(Continued)

(52) U.S. Cl.
CPC .......... *G06V 20/64* (2022.01); *G05D 1/0251* (2013.01); *G06F 18/214* (2023.01); *G06F 18/2163* (2023.01); *G06V 20/41* (2022.01); *G06V 20/46* (2022.01); *G06V 20/56* (2022.01); *G05D 2201/0213* (2013.01); *G06N 3/04* (2013.01); *G06V 2201/08* (2022.01)

(58) Field of Classification Search
CPC ........ G06V 20/64; G06V 20/41; G06V 20/46; G06V 20/56; G06V 2201/08; G05D 1/0251; G05D 2201/0213; G06K 9/6256; G06K 9/6261; G06N 3/04
See application file for complete search history.

(56) References Cited

U.S. PATENT DOCUMENTS 9,361,352 B2 * 6/2016 Paglieroni ............. G06F 16/283
10,733,447 B2    8/2020 Rabinovich et al.
(Continued)

FOREIGN PATENT DOCUMENTS

WO    2018093796 A1    5/2018

OTHER PUBLICATIONS

Fabian Manhardt, Wadim Kehl, Adrien Gaidon, ROI-10D: Monocular Lifting of 2D Detection to 6D Pose and Metric Shape (Year: 2019).*
Yin, et al., "Center-based 3D Object Detection and Tracking", arXiv:2006.11275v2, Jan. 6, 2021.
Li, et al., "Siamese Keypoint Prediction Network for visual object tracking", arXiv:2006.04078v1, Jun. 7, 2020.
(Continued)

*Primary Examiner* — Emily C Terrell
*Assistant Examiner* — Ahmed A Nasher
(74) *Attorney, Agent, or Firm* — SEYFARTH SHAW LLP (57) ABSTRACT

A method for 3D object detection is described. The method includes detecting semantic keypoints from monocular images of a video stream capturing a 3D object. The method also includes inferring a 3D bounding box of the 3D object corresponding to the detected semantic vehicle keypoints. The method further includes scoring the inferred 3D bounding box of the 3D object. The method also includes detecting the 3D object according to a final 3D bounding box generated based on the scoring of the inferred 3D bounding box.

14 Claims, 6 Drawing Sheets

(51) Int. Cl.
*G06F 18/214* (2023.01)
*G06F 18/21* (2023.01)
*G06N 3/04* (2023.01)

(56) References Cited

U.S. PATENT DOCUMENTS

| | | | |
|---|---|---|---|
| 10,955,855 B1* | 3/2021 | Tran | G05D 1/0246 |
| 2019/0279014 A1 | 9/2019 | Fang et al. | |
| 2020/0219316 A1* | 7/2020 | Baik | G06T 7/70 |
| 2020/0327343 A1* | 10/2020 | Lund | H04W 4/46 |
| 2021/0073977 A1* | 3/2021 | Carter | G06T 11/20 |
| 2022/0026917 A1* | 1/2022 | Beijbom | G06V 10/25 |
| 2022/0130156 A1* | 4/2022 | Shi | G06V 10/40 |
| 2022/0161815 A1* | 5/2022 | Van Beek | B60W 40/04 |
| 2022/0222477 A1* | 7/2022 | Shen | G06V 10/82 |

OTHER PUBLICATIONS

Kulkarni, et al., "Unsupervised Learning of Object Keypoints for perception and control", arXiv:1906.11883v2, Nov. 20, 2019.
Dwibedi, et al., "Deep Cuboid Detection Beyond 2D Bounding Boxes", arXiv:1611.10010v1, Nov. 30, 2016.
Dong, et al., "CentripetalNet Pursuing High-quality Keypoint Pairs for Object Detection", arXiv:2003.09119v1, Mar. 20, 2020.
Liu, et al., "SMOKE: Single-Stage Monocular 3D Object Detection via Keypoint Estimation," arXiv:2002.10111v1, Feb. 24, 2020.
Duan, et al., "CenterNet: Keypoint Triplets for Object Detection," arXiv:1904.08189v3, Apr. 19, 2019.
Tang, et al., "Center3D: Center-based Monocular 3D Object Detection with Joint Depth Understanding," arXiv:2005.13423v1, May 27, 2020.
Tang, et al., "Neural Outlier Rejection for Self-Supervised Keypoint Learning," arXiv:1912.10615v1, Dec. 23, 2019.

* cited by examiner

LEARNING MONOCULAR 3D OBJECT DETECTION FROM 2D SEMANTIC KEYPOINT DETECTION

BACKGROUND

Field

Certain aspects of the present disclosure generally relate to machine learning and, more particularly, a system and method for learning monocular 3D object detection from 2D semantic keypoint detection.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in an image of a surrounding scene of the autonomous agent. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous vehicle. Object detection applications for autonomous vehicles may analyze sensor image data for detecting objects in the surrounding scene from the autonomous agent.

Autonomous agents, such as driverless cars and robots, are quickly evolving and have become a reality in this decade. Detecting 3D objects in RGB images and matching them across views is a fundamental capability of many robotic systems. Conventional autonomous systems may rely on LIDAR for performing 3D object detection. Unfortunately, using LIDAR for performing 3D object detection is expensive. That is, monocular 3D object detection from cameras thanks to 2D semantic keypoint detection is desired.

SUMMARY

A method for 3D object detection is described. The method includes detecting semantic keypoints from monocular images of a video stream capturing a 3D object. The method also includes inferring a 3D bounding box of the 3D object corresponding to the detected semantic vehicle keypoints. The method further includes scoring the inferred 3D bounding box of the 3D object. The method also includes detecting the 3D object according to a final 3D bounding box generated based on the scoring of the inferred 3D bounding box.

A non-transitory computer-readable medium having program code recorded thereon for 3D object detection is described. The program code is executed by a processor. The non-transitory computer-readable medium includes program code to detect semantic keypoints from monocular images of a video stream capturing a 3D object. The non-transitory computer-readable medium also includes program code to infer a 3D bounding box of the 3D object corresponding to the detected semantic vehicle keypoints. The non-transitory computer-readable medium further includes program code to score the inferred 3D bounding box of the 3D object. The non-transitory computer-readable medium also includes program code to detect the 3D object according to a final 3D bounding box generated based on the scoring of the inferred 3D bounding box.

A system for 3D object detection is described. The system includes a semantic keypoint detection module to detect semantic keypoints from monocular images of a video stream capturing a 3D object. The system also includes a 3D bounding box module to infer a 3D bounding box of the 3D object corresponding to the detected semantic vehicle keypoints. The system further includes a bounding box scoring module to score the inferred 3D bounding box of the 3D object. The system also includes a 3D object detector model to detect the 3D object according to a final 3D bounding box generated based on the scoring of the inferred 3D bounding box.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Detecting 3D objects is essential for a variety of autonomous planning and navigation tasks. That is, performing robust 3D object detection is an important task for autonomous driving systems. Unfortunately, performing 3D object detection from monocular images is difficult because the scale and the depth of 3D objects is ill defined. Currently, most autonomous driving systems rely on 3D bounding boxes as an intermediate representation for 3D object detection using, for example, cuboid annotations. Unfortunately, these cuboid annotations are expensive to acquire and the representation can lead to unstable tracking in the presence of occlusions, unusual vehicle sizes, and ambiguous semantics. Furthermore, these labels are typically generated from light detection and ranging (LIDAR) point clouds, introducing a variety of re-projection and calibration issues when used in vision perception systems.

Detecting 3D vehicles in monocular images is a complex problem. Conventional autonomous driving systems may perform 3D vehicle detection by matching detected objects to massive amounts of learned patterns, which is a time consuming process. Aspects of the present disclosure avoid the complex processing of learned pattern matching by relying on universal vehicle keypoints. As described, keypoints may represent interest points of an image that are more low-level points and may not have clear semantic meaning, such as a corner point or ending point of a line segment. The keypoints may be detected using a keypoint heatmap. As described, a keypoint heatmap identifies broad regions of an image where a keypoint is likely found based on a final prediction. Semantic keypoints, on the other hand, can be tracked using rigid associations from frame to frame.

As described, 2D semantic keypoints are points of interest with semantic meaning for objects in an image, which may include universal vehicle keypoints. According to aspects of the present disclosure, universal vehicle keypoints may include: (1) headlights; (2) taillights; (3) license plates; and (4) wheel contact points with the ground. In aspects of the present disclosure, a human labeler may label the universal vehicle keypoints in an image at a frame-level. Based on the labeled universal vehicle keypoints in an image, assumptions may be performed regarding a vehicle geometry. For example, detection of the headlights may identify the front of a vehicle. Similarly, identification of a rear of the vehicle may be performed in response to detection of the taillights. In addition, a class of the vehicle may be determined by the number of wheel contact points to the ground. Universal vehicle keypoints enable additional leveraging of temporal and multi-view consistency constraints, which are robust in the presence of occlusions.

Aspects of the present disclosure are directed to a model that provides 3D object detection from monocular images by leveraging 2D semantic keypoints. In one aspect of the present disclosure, a 3D object detection model is composed of a shared backbone for feature extraction, a keypoint detector head, and a bounding box head. For example, the shared image backbone extracts relevant appearance and geometric features for semantic keypoint (e.g., universal vehicle keys) extraction by generating a keypoint heatmap. The detector head is composed of a semantic keypoint detector head (or decoder) that is supervised using ground-truth semantic keypoint annotations provided by a human labeler at a frame-level. A 3D detector head processes a set of semantic keypoints in a single frame/image. In some aspects, the bounding box head takes in the feature extracted by the shared backbone, and predicts the following values: (1) an objectness score; (2) an object classification score; and (3) 10D bounding box parameters for each pixel location of a monocular image.

For example, the objectness score indicates a likelihood that the pixel is occupied by an object of interest. In this example, the object classification score represents a confidence that the pixel is occupied by an object of a specific category. In addition, the predicted 10D bounding box parameters can be used to reconstruct a 3D cuboid from a given pixel location. In some aspects, the bounding box head is trained in a supervised manner, with the objectness score and the object classification score trained using a cross entropy loss. In addition, a 3D bounding box regression is trained using a Huber loss based on a Euclidean distance between the corners of the ground-truth and a predicted 3D bounding box in a world frame in some aspects of the present disclosure.

According to aspects of the present disclosure, a 3D object detection model infers a 3D bounding box by indexing a predicted 3D bounding box according to predicted semantic keypoint coordinates. The 3D bounding box is inferred according to the corresponding objectness score, class scores, and 10D bounding box parameters to the predicted semantic keypoint coordinates. In one aspect of the present disclosure, a final set of 3D bounding boxes is obtained after score-thresholding and non-maxima suppression. A 3D object detection system may be composed of: (1) a shared backbone for feature extraction; (2) a keypoint detector head trained in a supervised manner that detects semantic keypoints; and (3) a bounding box head trained in a supervised manner that predicts bounding boxes from the predicted semantic keypoint coordinates. The 3D object detection system may be trained end-to-end.

Figure 1:
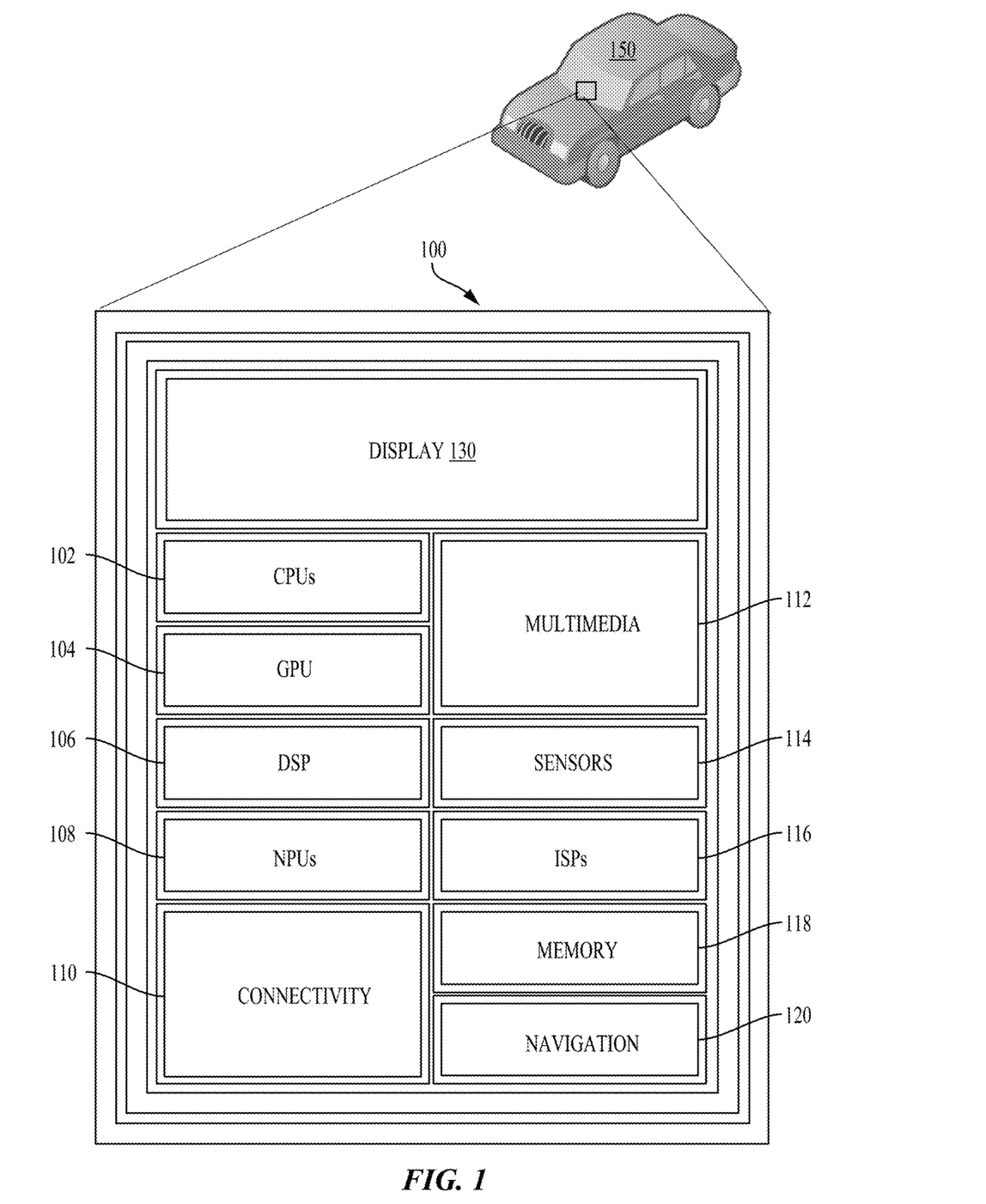
FIG. 1 illustrates an example implementation of designing a system using a system-on-a-chip (SOC) for monocular 3D object detection from 2D semantic keypoints, in accordance with aspects of the present disclosure.

FIG. 1 illustrates an example implementation of the aforementioned system and method for 3D object detecting via 2D semantic keypoints using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize semantic keypoints of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system (GPS).

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for monocular visual odometry in an image captured by the sensor processor 114. The instructions loaded into a processor (e.g., CPU 102) may also include code for planning and control (e.g., intention prediction of the ego vehicle) in response to detecting ego-motion of the ego vehicle based on an image captured by the sensor processor 114.

Figure 2:
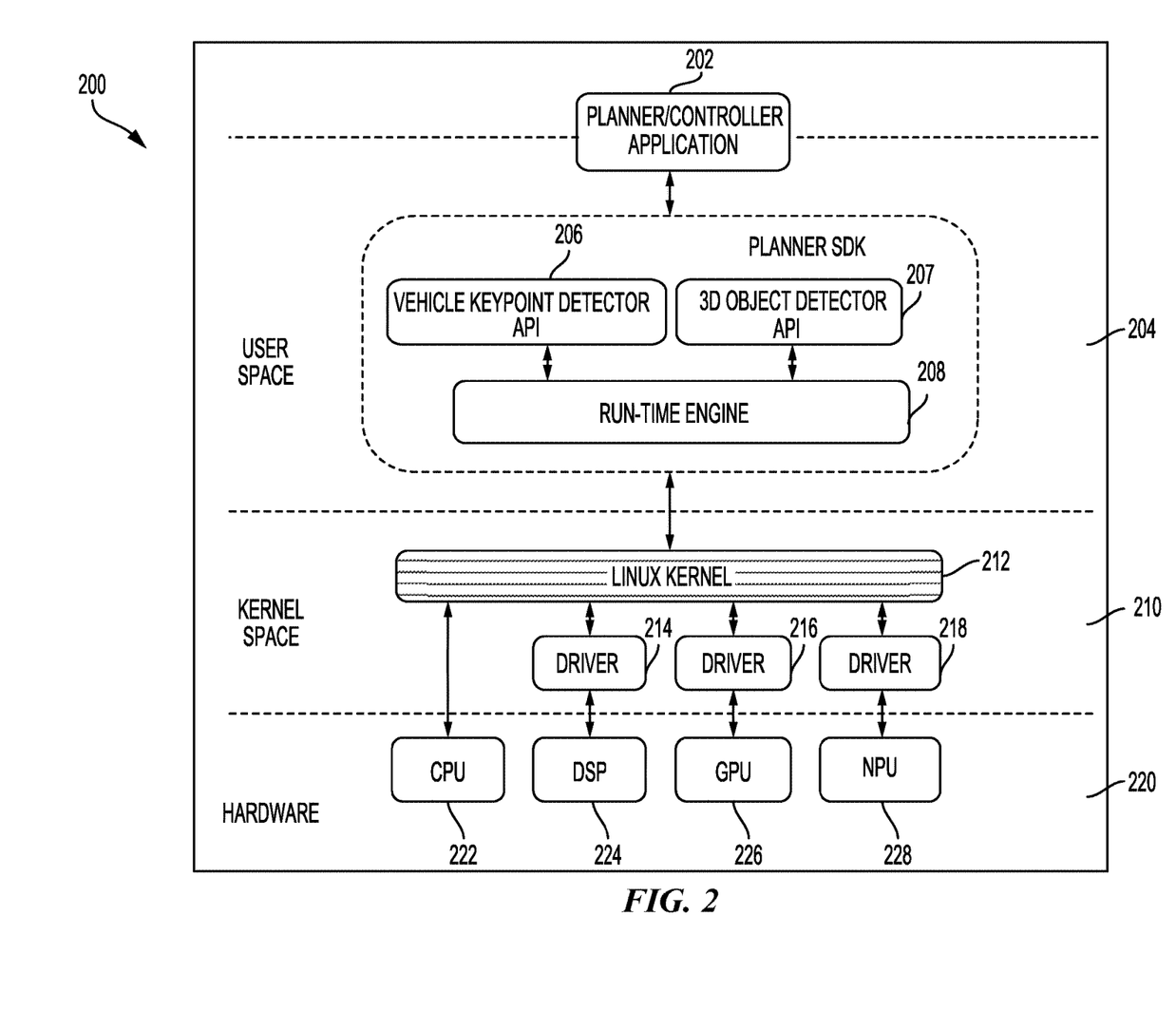
FIG. 2 is a block diagram illustrating a software architecture that may modularize functions for monocular 3D object detection from 2D semantic keypoints, according to aspects of the present disclosure.

FIG. 2 is a block diagram illustrating a software architecture 200 that may modularize functions for monocular 3D object detection using 2D semantic keypoints detected in frames of a video stream, according to aspects of the present disclosure. Using the architecture, a planner/controller application 202 may be designed to cause various processing blocks of a system-on-a-chip (SOC) 220 (for example a CPU 222, a DSP 224, a GPU 226, and/or an NPU 228) to perform supporting computations during run-time operation of the planner/controller application 202.

The planner/controller application 202 may be configured to call functions defined in a user space 204 that may, for example, provide for 3D object detection using 2D semantic keypoints detected in frames of a video stream captured by a monocular camera of an ego vehicle. The planner/controller application 202 may make a request to compile program code associated with a library defined in a vehicle keypoint detector application programming interface (API) 206 for semantic keypoint detection. The planner/controller application 202 may make a request to compile program code associated with a library defined in a 3D object detector API 207 for the task of detecting 3D objects in frames of a video stream captured by an autonomous agent.

A run-time engine 208, which may be compiled code of a runtime framework, may be further accessible to the planner/controller application 202. The planner/controller application 202 may cause the run-time engine 208, for example, to perform tracking of detecting semantic keypoints in subsequent frames of a monocular (single-camera) video stream. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
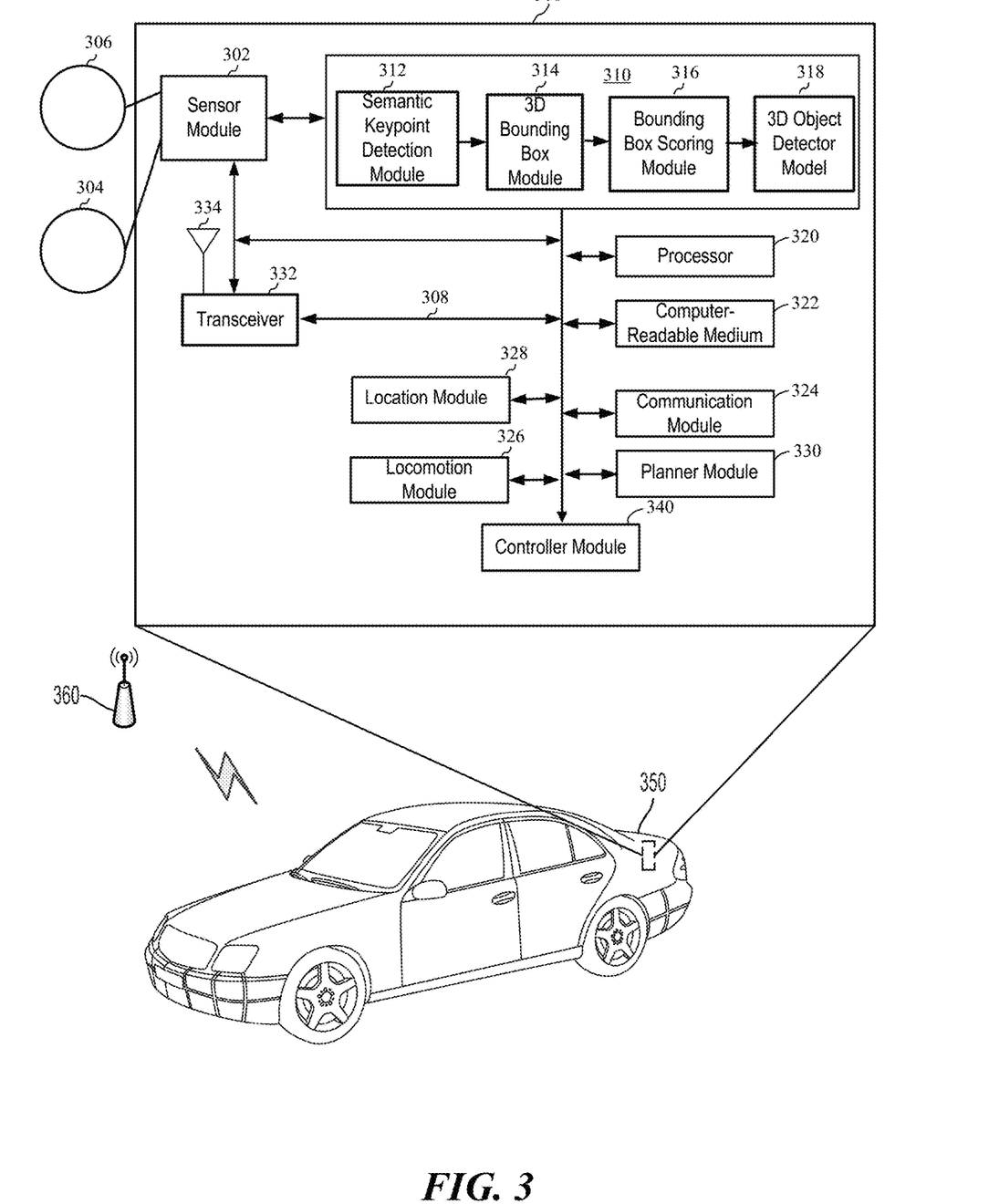
FIG. 3 is a diagram illustrating an example of a hardware implementation for a monocular 3D object detection system from 2D semantic keypoints, according to aspects of the present disclosure.

FIG. 3 is a diagram illustrating an example of a hardware implementation for a monocular 3D object detection system 300 using 2D semantic keypoints, according to aspects of the present disclosure. The 3D object detection system 300 may be configured for planning and control of an ego vehicle in response to 3D object detection within frames of monocular (single-camera) video stream captured during operation of a car 350. The 3D object detection system 300 may be a component of a vehicle, a robotic device, or other device. For example, as shown in FIG. 3, the 3D object detection system 300 is a component of the car 350. Aspects of the present disclosure are not limited to the 3D object detection system 300 being a component of the car 350, as other devices, such as a bus, motorcycle, or other like vehicle, are also contemplated for using the 3D object detection system 300. The car 350 may be autonomous or semi-autonomous.

The 3D object detection system 300 may be implemented with an interconnected architecture, represented generally by an interconnect 308. The interconnect 308 may include any number of point-to-point interconnects, buses, and/or bridges depending on the specific application of the 3D object detection system 300 and the overall design constraints of the car 350. The interconnect 308 links together various circuits including one or more processors and/or hardware modules, represented by a sensor module 302, an ego perception module 310, a processor 320, a computer-readable medium 322, communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The 3D object detection system 300 includes a transceiver 332 coupled to the sensor module 302, the ego perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit detected 3D objects and/or planned actions from the ego perception module 310 to a server (not shown).

The 3D object detection system 300 includes the processor 320 coupled to the computer-readable medium 322. The processor 320 performs processing, including the execution of software stored on the computer-readable medium 322 to provide keypoint tracking functionality, according to the present disclosure. The software, when executed by the processor 320, causes the 3D object detection system 300 to perform the various functions described for ego vehicle perception based on 2D semantic keypoint tracking between frames from video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, 5G new radio (NR), long term evolution (LTE), 3G, etc. The communication module 324 may also communicate with other components of the car 350 that are not modules of the 3D object detection system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), long term evolution (LTE), LTE-vehicle-to-everything (V2X), LTE-driver-to-driver (D2D), Voice over LTE (VoLTE), or any other mobile data network or combination of mobile data networks. Further, the network access point 360 may include one or more IEEE 802.11 wireless networks.

The 3D object detection system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular ego-motion estimation from images captured by the first sensor 304 or the second sensor 306 of the car 350.

Detecting 3D vehicles in monocular images is a complex problem. Conventional autonomous driving systems may perform 3D vehicle detection by matching detected objects to massive amounts of learned patterns, which is a time consuming process. Aspects of the present disclosure avoid the complex processing of learned pattern matching by relying on universal vehicle keypoints. As described, keypoints may represent interest points of an image that are more low-level points and may not have clear semantic meaning, such as a corner point or ending point of a line segment. The keypoints may be detected using a keypoint heatmap. As described, a keypoint heatmap identifies broad regions of an image where a keypoint is likely found based on a final prediction. Semantic keypoints, on the other hand, can be tracked using rigid associations from frame to frame.

As described, 2D semantic keypoints are points of interest with semantic meaning for objects in an image, which may include universal vehicle keypoints. According to aspects of the present disclosure, universal vehicle keypoints may include: (1) headlights; (2) taillights; (3) license plates; and (4) wheel contact points with the ground. In aspects of the present disclosure, a human labeler may label the universal vehicle keypoints in an image at a frame-level. Based on the labeled universal vehicle keypoints in an image, assumptions may be performed regarding a vehicle geometry. For example, detection of the headlights may identify the front of a vehicle. Similarly, identification of a rear of the vehicle may be performed in response to detection of the taillights. In addition, a class of the vehicle may be determined by the number of wheel contact points to the ground. Universal vehicle keypoints enable additional leveraging of temporal and multi-view consistency constraints, which are robust in the presence of occlusions.

As shown in FIG. 3, the ego perception module 310 includes a semantic keypoint detection module 312, a 3D bounding box module 314, a bounding box scoring module 316, and a 3D object detector model 318. The semantic keypoint detection module 312, the 3D bounding box module 314, the bounding box scoring module 316, and the 3D object detector model 318 may be components of a same or different artificial neural network. For example, the artificial neural network is a convolutional neural network (CNN) communicably coupled to a shared image backbone. The ego perception module 310 is not limited to the CNN and the shared image backbone. The ego perception module 310 receives a data stream from the first sensor 304 and/or the second sensor 306. The data stream may include a 2D red-green-blue (RGB) image from the first sensor 304 and/or the second sensor 306. The data stream may include multiple frames, such as image frames. In this configuration, the first sensor 304 captures monocular (single camera) 2D RGB images.

The ego perception module 310 is configured to perform 3D object detection using the semantic keypoint detection module 312 for the task of detecting 3D objects using the 3D object detector model 318. In one configuration, the semantic keypoint detection module 312 detects universal vehicle keypoints from monocular RGB images received from the first sensor 304 or the second sensor 306 for autonomous operation of the car 350. According to aspects of the present disclosure, the semantic keypoint detection module 312 is trained to detect universal vehicle keypoints using a keypoint heatmap from a shared image backbone (not shown).

In aspects of the present disclosure, the semantic keypoint detection module 312 is composed of a semantic keypoint detector head (or decoder) that is supervised using ground-truth semantic keypoint annotations provided by a human labeler at a frame-level. The semantic keypoint detection module 312 processes a set of semantic keypoints in a single frame/image. In some aspects, the 3D bounding box module 314 takes in the feature extracted by the shared backbone, and predicts the following values: (1) an objectness score; (2) an object classification score; and (3) 10D bounding box parameters for each pixel location of a monocular image. In addition, the 3D object detector model 318 is trained to detect the 3D object according to a final 3D bounding box based on the scoring of the inferred 3D bounding box using the bounding box scoring module 316.

According to aspects of the present disclosure, the 3D object detector model 318 infers a 3D bounding box by indexing a predicted 3D bounding box according to predicted semantic keypoint coordinates. The 3D object detector model 318 is trained to infer a 3D bounding box inferred according to an objectness score, a classification score, and 10D bounding box parameters corresponding to predicted semantic keypoint coordinates. In one aspect of the present disclosure, a final set of 3D bounding boxes is obtained by the 3D object detector model 318 after score-thresholding and non-maxima suppression using the bounding box scoring module 316 to enable autonomous vehicle operation, as shown in FIG. 4.

Aspects of the present disclosure are not limited to an autonomous agent or universal vehicle keypoints. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules. In addition, other universal object keypoints are completed for 3D object detection, such as pedestrians, bicycles, and other like object encountered on the road.

Figure 4:
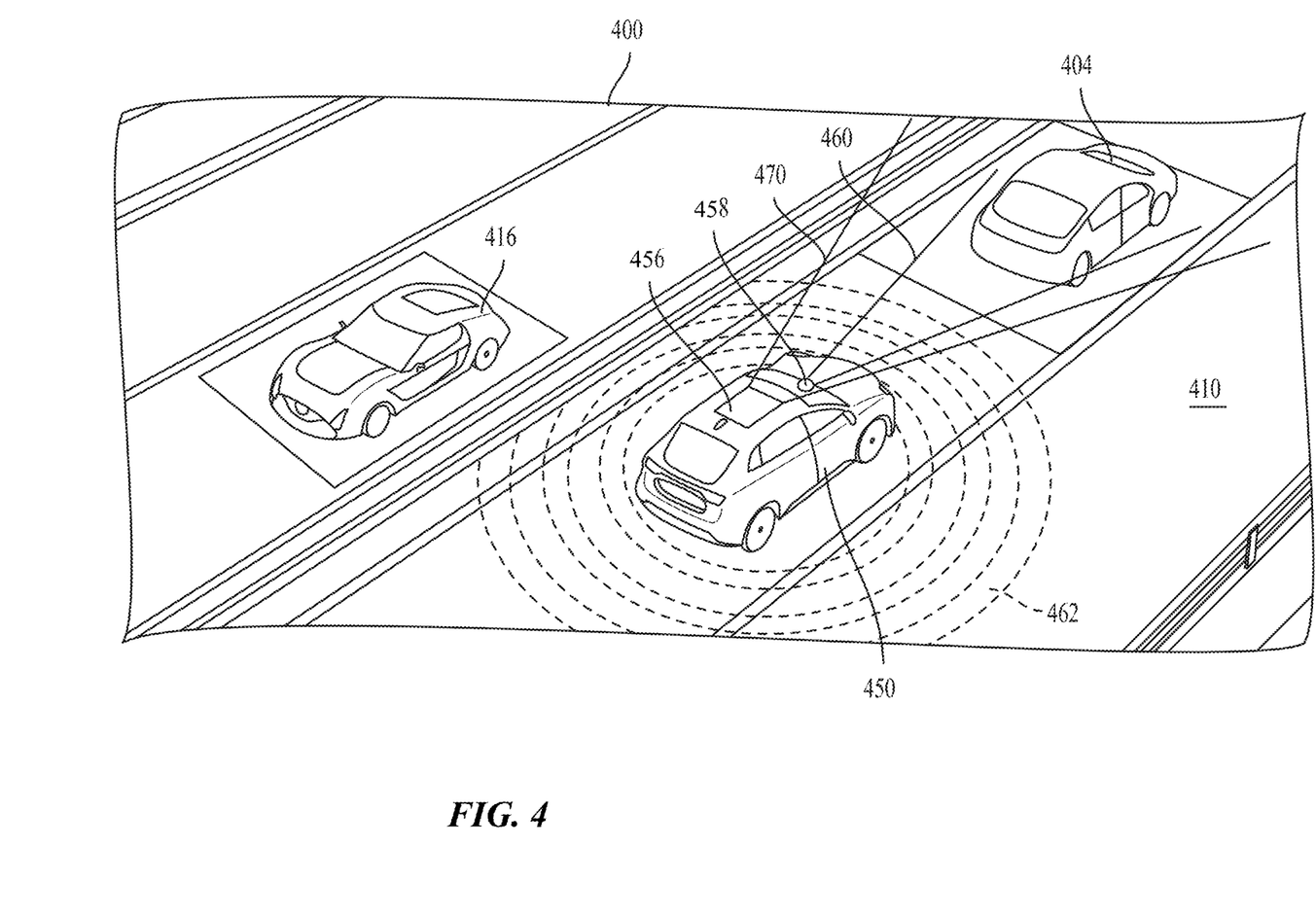
FIG. 4 is a drawing illustrating an example of an ego vehicle in an environment, according to aspects of the present disclosure.

FIG. 4 illustrates an example of an ego vehicle 450 (e.g., the car 350) in an environment 400, according to aspects of the present disclosure. As shown in FIG. 4, the ego vehicle 450 is traveling on a road 410. A first vehicle 404 (e.g., other agent) may be ahead of the ego vehicle 450, and a second vehicle 416 may be adjacent to the ego vehicle 450. In this example, the ego vehicle 450 may include a 2D camera 456, such as a 2D red-green-blue (RGB) camera, and a second sensor 458. The second sensor 458 may be another RGB camera or another type of sensor, such as ultrasound, and/or radio detection and ranging (RADAR), light detection and ranging (LIDAR), as shown by reference number 462. Additionally, or alternatively, the ego vehicle 450 may include one or more additional sensors. For example, the additional sensors may be side facing and/or rear facing sensors.

In one configuration, the 2D camera 456 captures a 2D image that includes objects in the field of view 460 of the 2D camera 456. The second sensor 458 may generate one or more output streams. The 2D image captured by the 2D camera 456 includes a 2D image of the first vehicle 404, as the first vehicle 404 is in the field of view 460 of the 2D camera 456. A field of view 470 of the second sensor 458 is also shown.

The information obtained from the 2D camera 456 and the second sensor 458 may be used to navigate the ego vehicle 450 along a route when the ego vehicle 450 is in an autonomous mode. The 2D camera 456 and the second sensor 458 may be powered from electricity provided from the battery (not shown) of the ego vehicle 450. The battery may also power the motor of the ego vehicle 450. The information obtained from the 2D camera 456 and the second sensor 458 may be used to generate a 3D representation of an environment.

Aspects of the present disclosure include a system and method for monocular 3D object detection in videos from 2D semantic keypoints. In aspects of the present disclosure, universal vehicle keypoints are labeled within each of the frames of a video stream. The cost of labeling universal vehicle keypoints is a fraction of the cost of performing 3D bounding box labeling in each of the frames of the video stream. According to aspects of the present disclosure, a 3D object detection system infers a 3D bounding box by indexing a predicted 3D bounding box according to predicted semantic keypoint coordinates.

In some aspects, a 3D bounding box is inferred according to an objectness score, a class score, and 10D bounding box parameters corresponding to predicted semantic keypoint coordinates. In one aspect of the present disclosure, a final set of 3D bounding boxes is obtained after score-thresholding and non-maxima suppression. A 3D object detection system may be composed of: (1) a shared backbone for feature extraction; (2) a keypoint detector head trained in a supervised manner that detects semantic keypoints; and (3) a bounding box head trained in a supervised manner that predicts bounding boxes from the predicted semantic keypoint coordinates. The 3D object detection system may be trained end-to-end, for example, as shown in FIG. 5.

Figure 5:
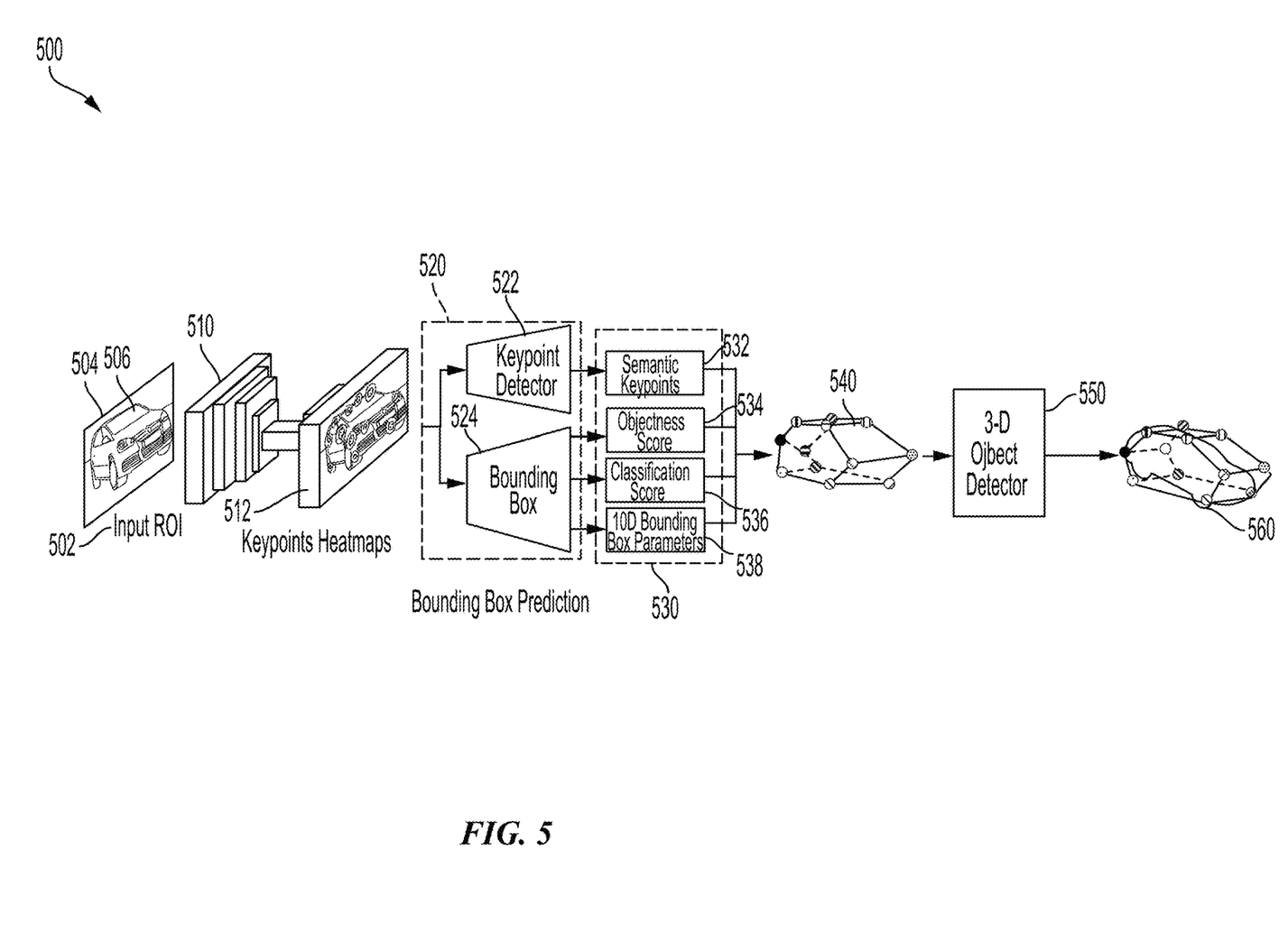
FIG. 5 is a block diagram illustrating an architecture for monocular 3D object detection in videos from 2D semantic keypoint detection, according to aspects of the present disclosure.

FIG. 5 is a block diagram illustrating an architecture for monocular 3D object detection in videos from 2D semantic keypoint detection, according to aspects of the present disclosure. In one aspect of the present disclosure, a 3D object detection framework 500 is used to implement the ego perception module 310 shown in FIG. 3 using, for example, a 3D bounding box prediction and scoring to enable 3D object detection. In aspects of the present disclosure, a model is provided for estimating a scale and a location of a 3D object vehicle using universal vehicle keypoints. This architecture includes an estimation model as a cue for 3D object detection within frames of a video stream.

The 3D object detection framework 500 is composed of multiple stages, including a shared image encoder backbone stage to enable semantic keypoint detection. The 3D object detection framework 500 also includes a 3D bounding box prediction stage having a keypoint detector head that detects relevant and semantically consistent keypoint features of objects in 2D monocular images of video frames. The 3D bounding box prediction stage further includes a bounding box predictor head that generates scores and parameters regarding predicted 3D bounding boxes. The 3D object detection framework 500 includes a 3D object detector to detect a 3D object according to a final 3D bounding box based on scoring of an inferred/predicted 3D bounding box. A 3D bounding box regression is trained using a Huber loss based on the Euclidean distance between the corners of the ground-truth and the predicted 3D bounding boxes in a world frame in some aspects of the present disclosure.

In one configuration, the 3D object detection framework 500 is composed of a shared image encoder backbone 510. In this configuration, the shared image encoder backbone 510 receives frames of a monocular video stream. For example, the shared image encoder backbone 510 receives an input region of interest (ROI) 502 of a frame 504 of a monocular video stream, including an object 506, such as a vehicle. The shared image encoder backbone 510 receives the frame 504 from the monocular video stream and extracts relevant appearance and geometric features of the object 506. In aspects of the present disclosure, the shared image encoder backbone 510 generates a keypoint heatmap 512 of the object 506 to enable 2D semantic keypoint extraction. The keypoint heatmap 512 is provided to a 3D bounding box prediction stage 520. In this example, the keypoint heatmap 512 includes universal semantic keypoints that are labeled in frames of a monocular video stream (e.g., universal vehicle keypoints) during training.

Detecting 3D vehicles in monocular images is a complex problem. Conventional autonomous driving systems may perform 3D vehicle detection by matching detected objects to massive amounts of learned patterns, which is a time consuming process. Aspects of the present disclosure avoid the complex processing of learned pattern matching by relying on universal vehicle keypoints. As described, keypoints may represent interest points of an image that are more low-level points and may not have clear semantic meaning, such as a corner point or ending point of a line segment. The keypoints may be detected using a keypoint heatmap. Universal vehicle keypoints, on the other hand, can be tracked using rigid associations from frame to frame.

According to aspects of the present disclosure, universal vehicle keypoints may include: (1) headlights; (2) taillights; (3) license plates; and (4) wheel contact points to the ground. In aspects of the present disclosure, a human labeler may label the universal vehicle keypoints in an image at a frame-level. Based on the labeled universal vehicle keypoints in an image, assumptions may be performed regarding a vehicle geometry. For example, detection of the headlights may identify the front of a vehicle. Similarly, identification of a rear of the vehicle may be performed in response to detection of the taillights. In addition, a class of the vehicle may be determined by the number of wheel contact points to the ground. Universal vehicle keypoints may enable additional leveraging of temporal and multi-view consistency constraints, which are robust in the presence of occlusions.

In aspects of the present disclosure, the 3D object detection framework 500 is composed of a 3D bounding box prediction stage 520. The 3D bounding box prediction stage 520 is composed of a keypoint detector head 522 and a bounding box head 524. The keypoint detector head 522 is supervised using ground-truth semantic keypoint annotations provided by a human labeler at a frame-level. The keypoint detector head 522 processes a set of semantic keypoints in a single frame/image. In some aspects, the 3D bounding box prediction stage 520 takes in the features extracted by the shared image encoder backbone 510 to generate bounding box prediction values 530.

In this example, the keypoint detector head 522 generates predicted semantic keypoints 532 in response to the keypoint heatmap 512, including the features extracted by the shared image encoder backbone 510. In addition, the bounding box head 524 predicts the following values: (1) an objectness score 534; (2) an object classification score 536; and (3) 10D bounding box parameters 538 for each pixel location of a monocular image, such as the input ROI 502. The bounding box prediction values 530 enable the 3D bounding box prediction stage 520 to predict an inferred 3D bounding box 540 of the 3D object 506 corresponding to the predicted semantic keypoints 532. In addition, a 3D object detector 550 is trained to detect the 3D object 506 according to a final 3D bounding box 560 based on the scoring of the inferred 3D bounding box 540 using the bounding box prediction values 530. In this example, the 3D object 506 is a vehicle.

For example, the objectness score 534 indicates a likelihood that the pixel is occupied by an object of interest. In this example, the object classification score 536 represents a confidence that the pixel is occupied by an object of a specific category. In addition, the predicted 10D bounding box parameters 538 can be used to reconstruct a 3D cuboid from a given pixel location. In some aspects, the bounding box head 524 is trained in a supervised manner, with the objectness score 534 and the object classification score 536 trained using a cross entropy loss. In addition, a 3D bounding box regression is performed by the 3D object detector 550. In some aspects, the 3D object detector 550 is trained using a Huber loss based on the Euclidean distance between the corners of the ground-truth and a predicted 3D bounding box in a world frame. In some aspects of the present disclosure, the Euclidean distance between the predicted 3D bounding box and the ground-truth bounding box coordinates is used to derive the signal which optimizes the 3D object detector 550. In this example, the Huber loss decreases sensitivity to outliers.

According to aspects of the present disclosure, the 3D bounding box prediction stage 520 predicts the inferred 3D bounding box 540 by indexing the inferred 3D bounding box 540, according to predicted semantic keypoint coordinates. The inferred 3D bounding box 540 is predicted according to the corresponding objectness score 534, the object classification score 536, and 10D bounding box parameters 538 corresponding to the predicted semantic keypoints 532 coordinates. In one aspect of the present disclosure, the final 3D bounding box 560 is obtained after score-thresholding and non-maxima suppression of the bounding box prediction values 530. A 3D object detection process is further described in FIG. 6.

Figure 6:
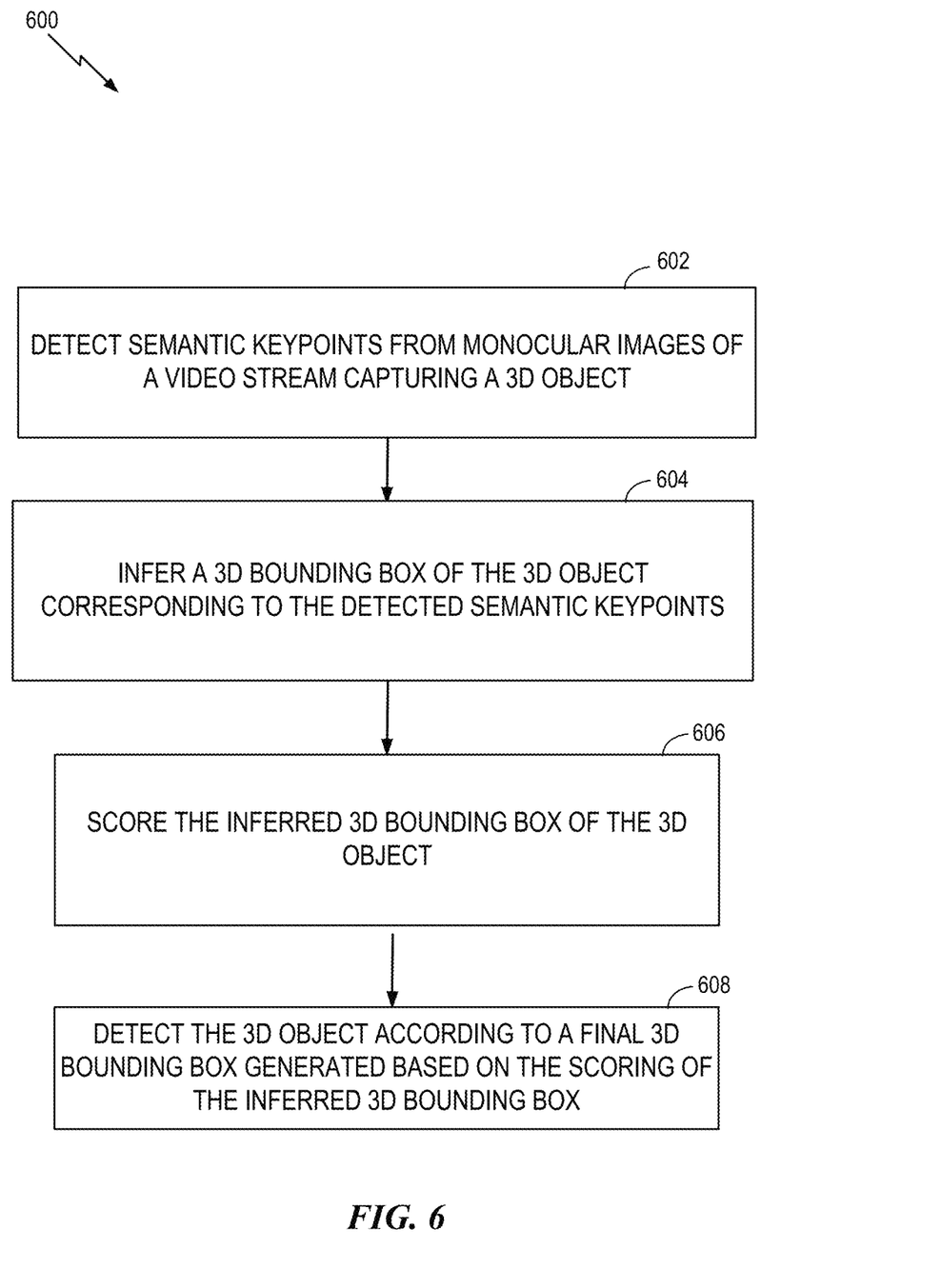
FIG. 6 is a flowchart illustrating a method for monocular 3D object detection from 2D semantic keypoints, according to aspects of the present disclosure.

FIG. 6 is a flowchart illustrating a method for 3D object detection, according to aspects of the present disclosure. The method 600 begins at block 602, in which semantic keypoints are detected from monocular images of a video stream capturing a 3D object. For example, as shown in FIG. 5, the 3D bounding box prediction stage 520 is composed of the keypoint detector head 522 and the bounding box head 524. The keypoint detector head 522 is supervised using ground-truth semantic keypoint annotations provided by a human labeler at a frame-level. The keypoint detector head 522 processes a set of semantic keypoints in a single frame/image. In some aspects, the keypoint detector head 522 takes in the feature extracted by the shared image encoder backbone 510 to generate the predicted semantic keypoints 532.

At block 604, a 3D bounding box of the 3D object corresponding to the detected semantic keypoints is inferred. For example, as shown in FIG. 5, the 3D bounding box prediction stage 520 predicts the inferred 3D bounding box 540 by indexing the inferred 3D bounding box 540 according to predicted semantic keypoint coordinates. At block 606, the inferred bounding box of the 3D object is scored. For example, as shown in FIG. 5, the bounding box head 524 predicts the following values: (1) an objectness score 534; (2) an object classification score 536; and (3) 10D bounding box parameters 538 for each pixel location of a monocular image, such as the input ROI 502. The bounding box prediction values 530 enable the 3D bounding box prediction stage 520 to predict an inferred 3D bounding box 540 of the 3D object 506 corresponding to the predicted semantic keypoints 532. For example, the inferred 3D bounding box 540 is predicted according to the corresponding objectness score 534, the object classification score 536, and 10D bounding box parameters 538 corresponding to the predicted semantic keypoints 532 coordinates.

At block 608, the 3D object is detected according to a final 3D bounding box generated based on the scoring of the inferred 3D bounding box. For example, as shown in FIG. 5, the 3D bounding box prediction stage 520 predicts the inferred 3D bounding box 540 by indexing the inferred 3D bounding box 540 according to predicted semantic keypoint coordinates. The inferred 3D bounding box 540 is predicted according to the corresponding objectness score 534, the object classification score 536, and 10D bounding box parameters 538 corresponding to the predicted semantic keypoints 532 coordinates. In one aspect of the present disclosure, the final 3D bounding box 560 is obtained after score-thresholding and non-maxima suppression of the bounding box prediction values 530. The method 600 also includes planning a trajectory of an ego vehicle according to the detecting of the 3D object. For example, given a number of 3D bounding boxes with varying scores and degrees of overlap and predicted by different keypoints, non-maxima suppression is a heuristic used to discard a set of bounding boxes that are redundant. Disregarding of the set of redundant bounding boxes may be based on a user-defined overlap threshold.

According to aspects of the present disclosure, a 3D object detection module infers a 3D bounding box by indexing a predicted 3D bounding box according to predicted semantic keypoint coordinates. The 3D bounding box is inferred according to a corresponding objectness score, a classification score, and 10D bounding box parameters to the predicted semantic keypoint coordinates. In one aspect of the present disclosure, a final set of 3D bounding boxes is obtained after score-thresholding and non-maxima suppression. A 3D object detection system may be composed of: (1) a shared backbone for feature extraction; (2) a keypoint detector head trained in a supervised manner that detects semantic keypoints; (3) a bounding box head trained in a supervised manner that predicts bounding boxes from the predicted semantic keypoint coordinates, and (4) a 3D object detection model to detect a 3D object based on a final 3D bounding box. The 3D object detection system may be trained end-to-end.

In some aspects of the present disclosure, the method 600 may be performed by the system-on-a-chip (SOC) 100 (FIG. 1) or the software architecture 200 (FIG. 2) of the ego vehicle 150 (FIG. 1). That is, each of the elements of the method 600 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more field-programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for 3D object detection, comprising:
   detecting semantic keypoints from monocular images of a video stream capturing a 3D object;
   inferring 3D bounding boxes of the 3D object by indexing the inferred 3D bounding box according to predicted keypoint coordinates corresponding to the detected semantic keypoints;
   scoring the inferred 3D bounding boxes of the 3D object according to an objectness score, an object classification score, and 10D bounding box parameters predicted according to the predicted coordinates of the detected semantic keypoints;
   discarding overlapping ones of the inferred 3D bounding boxes as redundant based on a user-defined overlap threshold using non-maxima suppression to determine a final set of 3D bounding boxes; and
   detecting the 3D object according to the final set of 3D bounding boxes generated based on the scoring of the inferred 3D bounding boxes using score-thresholding and the non-maxima suppression.

2. The method of claim 1, in which the semantic keypoints comprise universal vehicle keypoints.

3. The method of claim 2, in which the universal vehicle keypoints comprise taillights, headlights, license plates, and wheel contact points to ground.

4. The method of claim 2, further comprising labeling the universal vehicle keypoints in the images of the video stream during training.

5. The method of claim 2, further comprising extracting, using a shared image backbone, the universal vehicle keypoints within the images of the video stream based on relevant appearance and geometric features of the images.

6. The method of claim 1, further comprising planning a trajectory of an ego vehicle according to the detecting of the 3D object.

7. A non-transitory computer-readable medium having program code recorded thereon for 3D object detection, the program code being executed by a processor and comprising:
   program code to detect semantic keypoints from monocular images of a video stream capturing a 3D object;
   program code to infer 3D bounding boxes of the 3D object by indexing the inferred 3D bounding box according to predicted keypoint coordinates corresponding to the detected semantic keypoints;
   program code to score the inferred 3D bounding boxes of the 3D object according to an objectness score, an object classification score, and 10D bounding box parameters predicted according to the predicted coordinates of the detected semantic keypoints;
   program code to discard overlapping ones of the inferred 3D bounding boxes as redundant based on a user-defined overlap threshold using non-maxima suppression to determine a final set of 3D bounding boxes; and
   program code to detect the final set of 3D bounding boxes generated based on the scoring of the inferred 3D bounding boxes using score-thresholding and the non-maxima suppression.

8. The non-transitory computer-readable medium of claim 7, in which the semantic keypoints comprise universal vehicle keypoints.

9. The non-transitory computer-readable medium of claim 8, in which the universal vehicle keypoints comprise taillights, headlights, license plates, and wheel contact points to ground.

10. The non-transitory computer-readable medium of claim 8, further comprising program code to label the universal vehicle keypoints in the images of the video stream during training.

11. The non-transitory computer-readable medium of claim 8, further comprising program code to extract, using a shared image backbone, the universal vehicle keypoints within the images of the video stream based on relevant appearance and geometric features of the images.

12. The non-transitory computer-readable medium of claim 7, further comprising program code to plan a trajectory of an ego vehicle according to the detecting of the 3D object.

13. A system for 3D object detection, the system comprising:
   a semantic keypoint detection module to detect semantic keypoints from monocular images of a video stream capturing a 3D object;
   a 3D bounding box module to infer 3D bounding boxes of the 3D object by indexing the inferred 3D bounding box according to predicted keypoint coordinates corresponding to the detected semantic keypoints;
   a bounding box scoring module to score the inferred 3D bounding boxes of the 3D object according to an objectness score, an object classification score, and 10D bounding box parameters predicted according to the predicted coordinates of the detected semantic keypoints; and
   a 3D object detector model to discard overlapping ones of the inferred 3D bounding boxes as redundant based on a user-defined overlap threshold using non-maxima suppression to determine a final set of 3D bounding boxes, and to detect the 3D object according to the non-maxima suppression generated based on the scoring of the inferred 3D bounding boxes using score-thresholding and the non-maxima suppression.

14. The system of claim 13, further comprising a planner module to plan a trajectory of an ego vehicle according to detection of the 3D object.

\* \* \* \* \*